April 24, 1951 J. E. JENDRISAK 2,550,252
GLASS BENDING MOLD
Filed Dec. 7, 1942 2 Sheets-Sheet 1

Inventor
JOSEPH E. JENDRISAK,
By
Frank Fraser
Attorney

April 24, 1951  J. E. JENDRISAK  2,550,252
GLASS BENDING MOLD

Filed Dec. 7, 1942  2 Sheets-Sheet 2

Inventor
JOSEPH E. JENDRISAK.

By Frank Fraser
Attorney

Patented Apr. 24, 1951

2,550,252

UNITED STATES PATENT OFFICE 2,550,252

GLASS BENDING MOLD

Joseph E. Jendrisak, Rossford, Ohio, assignor to Libbey-Owens-Ford Glass Company, Toledo, Ohio, a corporation of Ohio Application December 7, 1942, Serial No. 468,045

1 Claim. (Cl. 49—67)

The present invention relates broadly to the art of bending and more particularly to the bending of sheets or plates of glass or other plastic material to predetermined curvatures.

Heretofore, it has been the usual practice to bend glass sheets or plates either in sand molds or iron molds. The sheet to be bent is ordinarily placed horizontally upon the mold in a furnace and the temperature of both the mold and sheet raised until the glass becomes softened and settles downwardly by gravity to conform to the shape of the mold.

The use of sand molds and iron molds is, however, open to certain practical objections. For instance, sand molds do not lend themselves to rapid and economical volume production because of the necessity of redressing or reworking the mold after each bending operation. Further, there are certain inherent restrictions in shape, size, and weight of glass which can be bent in sand molds because of the tendency of the mold to crumble or compress and thereby spoil its shape. Also, the quality of the glass bent thereon is sometimes adversely affected by the material from which the mold is formed.

As for iron molds, they are expensive and also difficult, often impractical, to obtain in intricate and irregular shapes, as well as being quite heavy and inconvenient to handle. Further, iron molds grow under heat and because of such growth are uncontrollable. Having changed shape in use, iron molds are difficult and expensive to reshape to the proper dimensions. It is often difficult to prevent the iron molds from spalling chips off the edges of glass sheets, thereby either cracking the sheet or spoiling its quality in the bent condition by pitting the glass at the point on the mold where the chips come to rest. To avoid marring of the softened sheet surface by the mold, it has been necessary to undercut or recess the bottom of the mold so that upon being bent the body portion of the sheet will not come in contact with the mold.

It is an aim of this invention to overcome the above objections to the use of sand and iron molds by the provision of an improved form of bending mold whereby glass sheets or plates may be bent to an accurate predetermined curvature of a high quality and relatively free of surface defects.

Another object of the invention is to provide a bending mold which is of light weight, rendering it more easily and conveniently handled, and which also possesses relatively great mechanical strength as well as exceptional insulating value.

Another object of the invention is to provide a bending mold which will successfully withstand the severe temperature changes and physical shock to which it is subjected in actual use.

A further object of the invention is to provide a bending mold which can be economically produced in small or large numbers and which can be readily cut, machined or otherwise shaped to provide a bending surface of the desired curvature having a characteristic smooth machined finish which remains so even after repeated bending operations, thereby eliminating the necessity of undercutting the mold.

Other objects and advantages of the invention will become more apparent during the course of the following description, when taken in connection with the accompanying drawings.

In the drawings, wherein like numerals are employed to designate like parts throughout the same:

Figure 1:
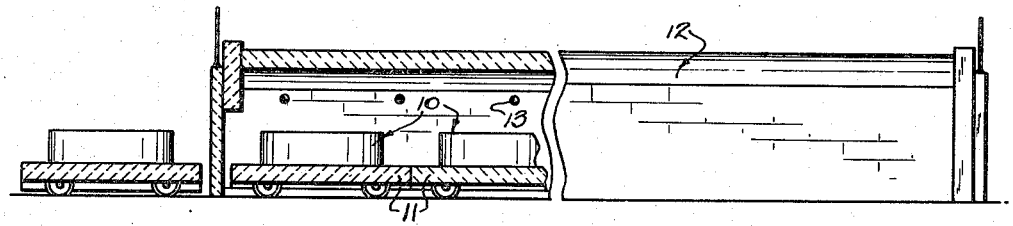
Fig. 1 is a side elevation, partially in section, of one form of glass bending furnace in which the improved molds of this invention may be used.

Although the improved molds of this invention are not restricted to use in any particular bending process, they have been illustrated in the drawings by way of example as being used in a continuous bending operation in which the molds 10, mounted upon cars or tables 11, are passed through a furnace 12 of tunnel-like formation heated in any desired manner such as by the radiant heating tubes 13. Also, while the molds may be either of the convex or concave type, they have been herein shown as having their upper surfaces concave to correspond to the curvature to be given the glass sheet or sheets.

Figure 2:
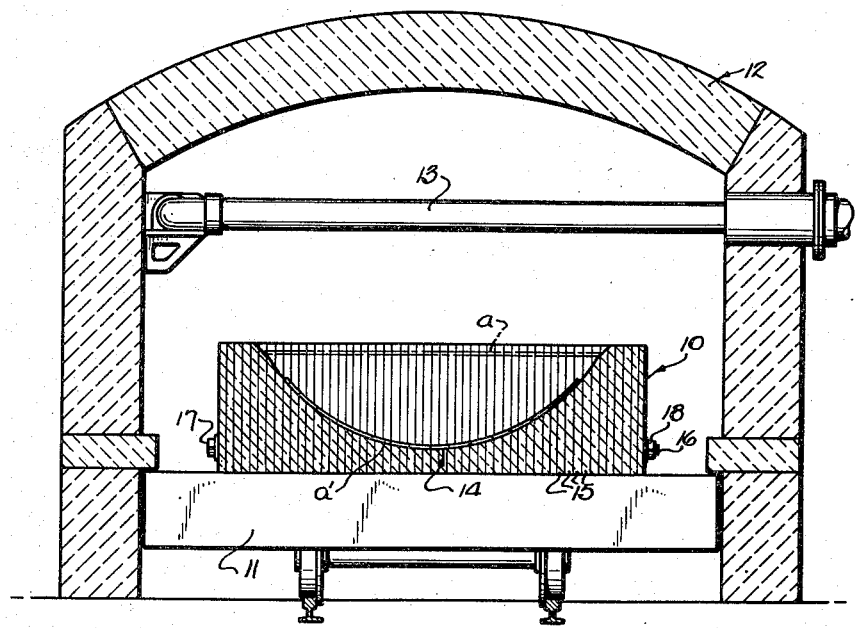
Fig. 2 is a vertical transverse section through the furnace and one type of mold used in the bending of the glass sheets or plates.
Figure 3:
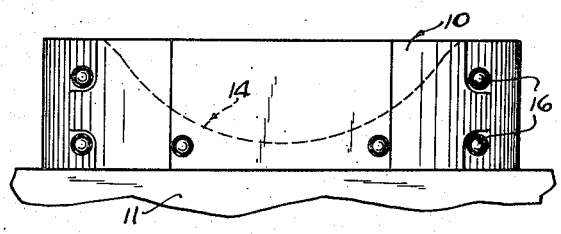
Fig. 3 is a side elevation of the mold.
Figure 4:
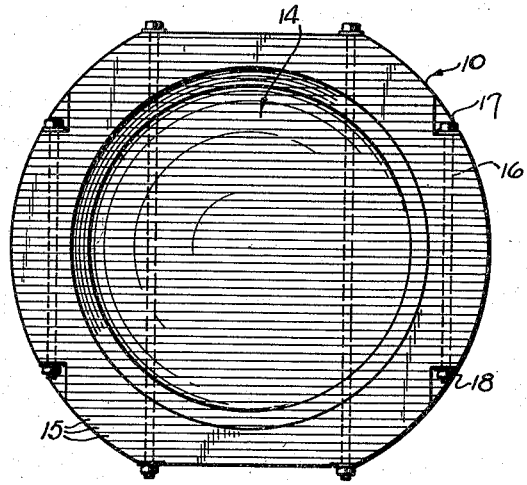
Fig. 4 is a plan view thereof.

With reference particularly to Figs. 2, 3 and 4, the mold 10 is formed with a concave bending surface 14 of spherical formation. In practice, a flat sheet of glass $a$ to be bent is laid horizontally upon the mold as indicated in broken lines in Fig. 2, and as the said mold and sheet are carried through the furnace 12, the glass will be heated to a temperature sufficient to cause the sheet to soften and to sink or settle downwardly by its own weight into the mold and take the shape of the curved bending surface 14 as shown in full lines at a'. After being bent, the glass sheet is adapted to be annealed and cooled upon continued travel of the mold through the furnace so that upon emerging therefrom the said sheet may be readily removed from the mold.

The bending mold 10 is made up of a plurality of laminae 15 arranged in face to face abutting relation and secured together by bolts 16 passing transversely therethrough. The laminae 15 consist of boards or plates of a special type of material having a high insulating value and which will effectively withstand the heat to which the mold is subjected during the bending operation. More particularly, the laminae 15 consist of sheets or plates of a solid homogeneous material made of asbestos fiber with an inorganic binder. Sheet material of this type affords a strong light weight board that does not disintegrate under soaking moisture and which cannot burn. It also possesses exceptional insulating value and can be readily sawed, cut, machined or otherwise shaped. By way of example, one type of insulating board which has been successfully used is that known to the trade as "Marinite," manufactured by the Johns-Manville Company.

Any suitable number of bolts 16 may be employed for securing the laminae 15 together and each bolt is headed at one end as at 17 and has threaded upon its opposite end a nut 18 so that upon tightening of the nuts, the laminae will be clamped tightly against one another to provide, in effect, a solid body having a substantially unbroken upper surface. After the laminae have been secured together, the upper edges thereof may be machined or otherwise suitably dressed to provide the desired concave or convex bending surface 14. When forming a true spherical bending surface, the laminae can be machined to give a characteristic machined surface which is smooth and which is not adversely affected by repeated passages of the mold through the bending furnace. The bending surface is also of such character that it will not mar the glass surface and thereby eliminates the necessity for undercutting the mold. On the other hand, when making irregular or similar types of bends, the bending surface of the mold may be initially ground out with a suitable routing tool and then scraped.

When making relatively deep spherical bends where the glass must be heated to a relatively high temperature and drawn or stretched, it is sometimes desirable to provide a so-called "protection light" consisting of a thin sheet of glass beneath the sheet to be bent and then bend the two sheets simultaneously. In this way, any fine markings which may be formed on the protection light by the lines of demarcation between the adjacent laminae will not be transmitted or passed on to the upper sheet being bent.

It has been found that a bending mold of the character above described does not absorb as much heat as, for example, iron molds. Therefore, the glass will heat up and soften more rapidly, giving a faster bending cycle and better quality glass. Further, the bending furnace can be maintained at a lower temperature with a resulting saving in fuel.

In fabricating the mold and before the laminae 15 are secured together to form the mold blank, the said laminae are preferably "fired" by heating them to a temperature above the maximum temperature to be encountered in the bending operation and gradually cooling them to room temperature. This firing effects the initial shrinkage of the laminae and eliminates subsequent warping or distortion of the mold from the heat of the furnace. In other words, the mold is normalized before being placed in actual use and, because of the firing of the laminae, the bending surface is stable and the mold does not change in size or shape during the bending operation.

The bending surface may be suitably shaped to produce either simple or compound bends and, in addition, the mold may be employed for bending two or more sheets of glass simultaneously for subsequent laminating to produce safety glass as well as for bending single sheets. As pointed out above, the bending surface 14 in Figs. 2 and 3 is of spherical formation and there is at the present time an increasing demand, particularly in the aircraft industry, for spherical or spherical type bends.

Figure 5:
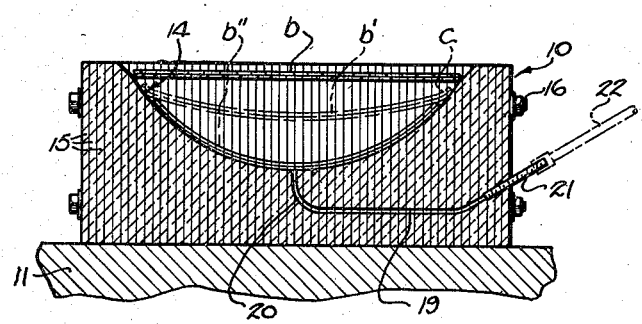
Fig. 5 is a transverse section through a slightly modified type of mold.

When making true spherical bends, there is sometimes a tendency for the glass to wrinkle around the edges thereof when it becomes soft and sinks downwardly into the mold. This objection may be overcome by subjecting the sheet in the mold first to an initial or prebending step by causing it to sink partially downwardly into the mold by gravity, after which the sheet is subjected to a second step by applying suction to effect the final bending thereof. This method is illustrated in Fig. 5, wherein a pair of glass sheets b to be bent are placed upon the upper concave surface 14 of the mold.

The mold and sheets are then heated sufficiently to cause said sheets to become softened and to drop or settle down by their own weight partially into the mold and take the shape indicated at broken lines b'. After the glass sheets have been prebent they are drawn down into the mold to take the shape thereof as indicated at b'' and this final bending is effected by a suitable suction creating apparatus (not shown). To this end, the body of the mold is provided with a horizontal opening 19 leading from one side of the mold to substantially the center thereof and terminating in an upturned end portion 20 communicating with the interior of the mold beneath the glass sheets. Suitably secured within the outer end of the opening 19 is a fitting 21 to which is adapted to be attached a pipe 22 connected with suitable suction creating apparatus. After the sheets have been prebent as shown at b', the final bending is accomplished by engaging the pipe 22 with the fitting 21 whereupon air can be withdrawn from the chamber beneath the glass sheets causing said sheets to be drawn downwardly into contact with the mold face.

This method is particularly adaptable for bending two or more sheets of glass simultaneously. Thus, the prebending of the glass sheets in the manner above described results in the sheets becoming wedged down into the mold by the bending of the edge portions thereof as indicated at c which not only seals the space between the edges of the sheets and the mold but also permits the sheets to be acted upon by suction as though they were, in effect, only a single sheet.

The type of mold herein provided is particularly suitable for making spherical bends where suction is used to effect the final bending due to the fact that it is difficult to stop the bending the instant the glass contacts the mold surface. In other words, the surface characteristics of the mold are such that undercutting of the mold is not required and the glass may be brought into direct contact therewith.

Figure 6:
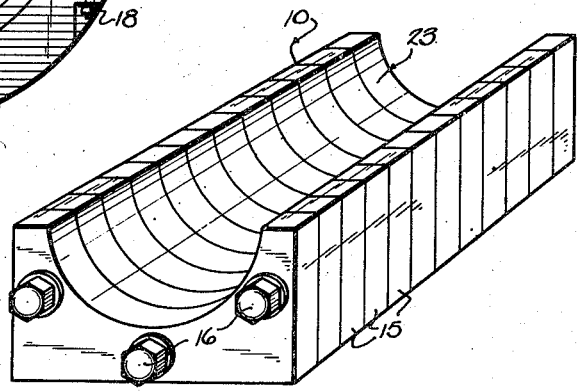
Fig. 6 is a perspective view of still another form of mold embodying the invention.

In Fig. 6 is illustrated another form of mold made up of a plurality of laminae 15 arranged in abutting face to face relation and firmly clamped to one another by the bolts 16. This mold is formed in the same manner as above described with the exception that the bending surface 23 thereof is cylindrical to produce a cylindrical type of bend.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claim.

I claim:

A bending mold for bending glass sheets in a bending furnace, comprising a plurality of laminae of a homogeneous composition sheet material made up of asbestos fiber with an inorganic binder which have previously been heated to a temperature above the maximum temperature to be encountered in the bending furnace and then cooled to room temperature, secured together in face to face abutting relation with the edges of the laminae machined to a smooth, continuous and accurately curved bending surface.

JOSEPH E. JENDRISAK.

REFERENCES CITED

The following references are of record in the file of this patent:

UNITED STATES PATENTS

| Number | Name | Date |
| --- | --- | --- |
| 760,959 | Connington | May 24, 1904 |
| 991,025 | Robier | May 2, 1911 |
| 2,137,115 | Marshall | Nov. 15, 1938 |
| 2,213,406 | Paddock et al. | Sept. 3, 1940 |
| 2,261,033 | Marshall | Oct. 28, 1941 |
| 2,317,904 | Galey | Apr. 27, 1943 |
| 2,348,279 | Boyles et al. | May 9, 1944 |
| 2,372,418 | Forbes et al. | Mar. 27, 1945 |

FOREIGN PATENTS

| Number | Country | Date |
| --- | --- | --- |
| 510,254 | Great Britain | July 31, 1939 |